US005950299A

United States Patent [19]

Perez-Alderete

[11] Patent Number: 5,950,299

[45] Date of Patent: Sep. 14, 1999

[54] PLASTER MEMORBILIA SYSTEM

[76] Inventor: Tomas R. Perez-Alderete, 13221 SW. 52$^{nd}$ St., Miami, Fla. 33175

[21] Appl. No.: 09/022,360

[22] Filed: Feb. 12, 1998

[51] Int. Cl.$^{6}$ .......... A47G 01/06; B29C 01/14

[52] U.S. Cl. .......... 29/462; 29/466; 29/525.11; 29/527.1; 40/781; 264/DIG. 30; 425/2

[58] Field of Search .......... 425/2, 317; 264/222.223, 264/DIG. 30; 40/743, 780, 781, 800; 29/462, 466, 525.11; 206/575

[56] References Cited

U.S. PATENT DOCUMENTS

| | | | |
|---|---|---|---|
| 2,558,650 | 6/1951 | Heineman et al. | 264/222 |
| 2,591,565 | 4/1952 | Llnnard | 264/222 |
| 2,682,725 | 7/1954 | Atwood | 40/800 |
| 2,909,805 | 10/1959 | James | 264/DIG. 30 |
| 2,996,757 | 8/1961 | Heflin | 264/DIG. 30 |
| 3,707,053 | 12/1972 | Itano | 40/781 |
| 4,012,026 | 3/1977 | Chambers | 425/2 |
| 4,828,116 | 5/1989 | Garcia | 425/2 |
| 4,888,377 | 12/1989 | Strader | 264/225 |
| 4,894,798 | 1/1990 | Silberstein | 40/781 |
| 5,148,618 | 9/1992 | Brewster | 40/781 |
| 5,695,066 | 12/1997 | Bartlett | 206/575 |

FOREIGN PATENT DOCUMENTS

| | | |
|---|---|---|
| 60-242006 | 12/1985 | Japan . |

*Primary Examiner*—Robert Davis

[57] ABSTRACT

A device for making plaster memorabilia is provided including a pan for accepting a predetermined amount of plaster therein. As such, various body parts may be impressed therein prior to the plaster drying after which a plaster block is rendered. Also included is a frame assembly for receiving the plaster block therein. The frame and plaster block are adapted to be mounted on a wall such that the impressions may be displayed via an outboard end of the frame.

5 Claims, 2 Drawing Sheets

PLASTER MEMORBILIA SYSTEM

BACKGROUND OF THE INVENTION

1. Field of the Invention

The present invention relates to plaster impressions and more particularly pertains to a new plaster memorabilia system for generating various articles of memorabilia.

2. Description of the Prior Art

The use of plaster impressions is known in the prior art. More specifically, plaster impressions heretofore devised and utilized are known to consist basically of familiar, expected and obvious structural configurations, notwithstanding the myriad of designs encompassed by the crowded prior art which have been developed for the fulfillment of countless objectives and requirements.

Known prior art plaster impressions include U.S. Pat. No. 3,940,523; U.S. Pat. No. 5,400,533; U.S. Pat. Des. 357,588; U.S. Pat. No. 5,413,870; U.S. Pat. No. 5,275,847; and U.S. Pat. No. 4,614,680.

In these respects, the plaster memorabilia system according to the present invention substantially departs from the conventional concepts and designs of the prior art, and in so doing provides an apparatus primarily developed for the purpose of generating various articles of memorabilia.

SUMMARY OF THE INVENTION

In view of the foregoing disadvantages inherent in the known types of plaster impressions now present in the prior art, the present invention provides a new plaster memorabilia system construction wherein the same can be utilized for generating various articles of memorabilia.

The general purpose of the present invention, which will be described subsequently in greater detail, is to provide a new plaster memorabilia system apparatus and method which has many of the advantages of the plaster impressions mentioned heretofore and many novel features that result in a new plaster memorabilia system which is not anticipated, rendered obvious, suggested, or even implied by any of the prior art plaster impressions, either alone or in any combination thereof.

To attain this, the present invention generally comprises a pan having a rectangular bottom face with a periphery having a side wall coupled thereto. Such side wall extends upwardly from the bottom face thereby defining an open top and an upper peripheral edge. The pan further includes a horizontally oriented peripheral flange integrally coupled to the upper peripheral edge of the pan and extending outwardly therefrom. In use, the pan is adapted to accept a predetermined amount of plaster therein. As such, various body parts may be impressed within the wet plaster prior to the plaster drying after which a plaster block is rendered. FIG. 5 shows a unitary writing utensil having a cylindrical configuration with a conical-shaped end. Such end is adapted for writing various alphanumeric characters in the plaster prior to the plaster drying. Also included is a frame assembly having a front extent with a side wall defining an open inboard end and an open outboard end. The side wall includes four side faces each beveled outwardly from the inboard end to the outboard end thereof. Note FIG. 2. The inboard end has a peripheral recess formed therein for receiving a periphery of the plaster block. Four posts are each integrally coupled to an associated one of four corners of the inboard end of the frame. These posts extend rearwardly from the frame with a coaxial threaded bore formed therein. The frame further includes a rear extent comprising a rectangular plate with a size and shape corresponding to that of the inboard end of the front extent. The rectangular plate has a plurality of sleeves each integrally coupled to an associated one of four corners of the plate and extending forwardly therefrom for releasably receiving the corresponding post of the front extent. In use, screws are adapted to pass through bores formed in the plate and engage the threaded bore of the associated post. Such action secures the plaster block within the frame such that the same may be hung on a wall and the impressions and characters may be displayed via the outboard end of the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plaster memorabilia system apparatus and method which has many of the advantages of the plaster impressions mentioned heretofore and many novel features that result in a new plaster memorabilia system which is not anticipated, rendered obvious, suggested, or even implied by any of the prior art plaster impressions, either alone or in any combination thereof.

It is another object of the present invention to provide a new plaster memorabilia system which may be easily and efficiently manufactured and marketed.

It is a further object of the present invention to provide a new plaster memorabilia system which is of a durable and reliable construction.

An even further object of the present invention is to provide a new plaster memorabilia system which is susceptible of a low cost of manufacture with regard to both materials and labor, and which accordingly is then susceptible of low prices of sale to the consuming public, thereby making such plaster memorabilia system economically available to the buying public.

Still yet another object of the present invention is to provide a new plaster memorabilia system which provides in the apparatuses and methods of the prior art some of the advantages thereof, while simultaneously overcoming some of the disadvantages normally associated therewith.

Still another object of the present invention is to provide a new plaster memorabilia system for generating various articles of memorabilia.

Even still another object of the present invention is to provide a new plaster memorabilia system that includes a pan for accepting a predetermined amount of plaster therein. As such, various body parts may be impressed therein prior to the plaster drying after which a plaster block is rendered. Also included is a frame assembly for receiving the plaster block therein. The frame and plaster block are adapted to be mounted on a wall such that the impressions may be displayed via an outboard end of the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
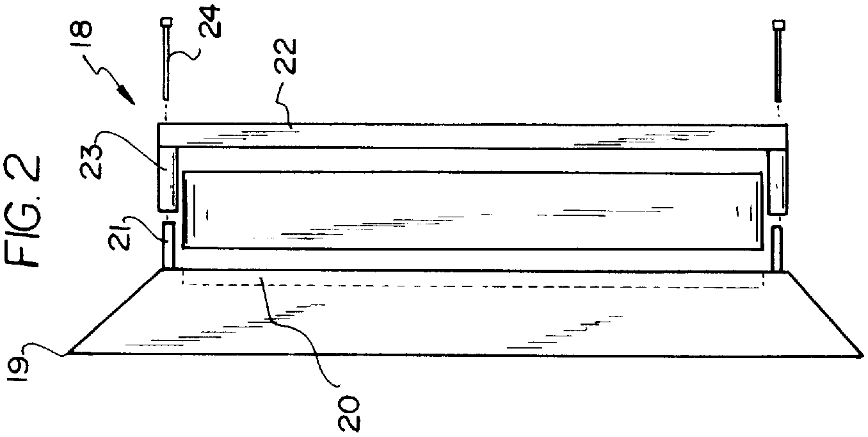
FIG. 2 is a side view of the frame and plaster block of the present invention.
Figure 1:
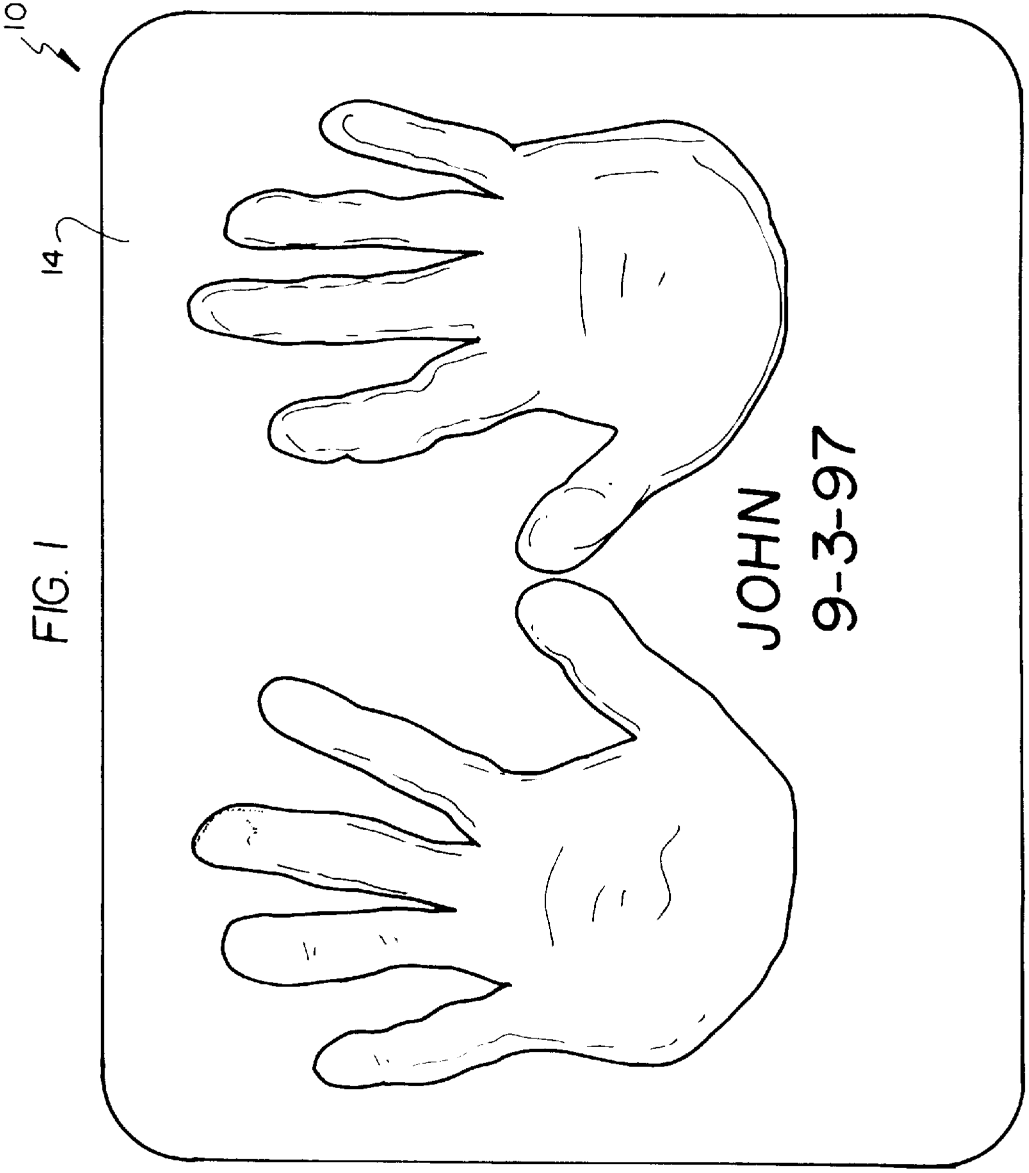
FIG. 1 is a top view of a new plaster memorabilia system according to the present invention.
Figure 3:
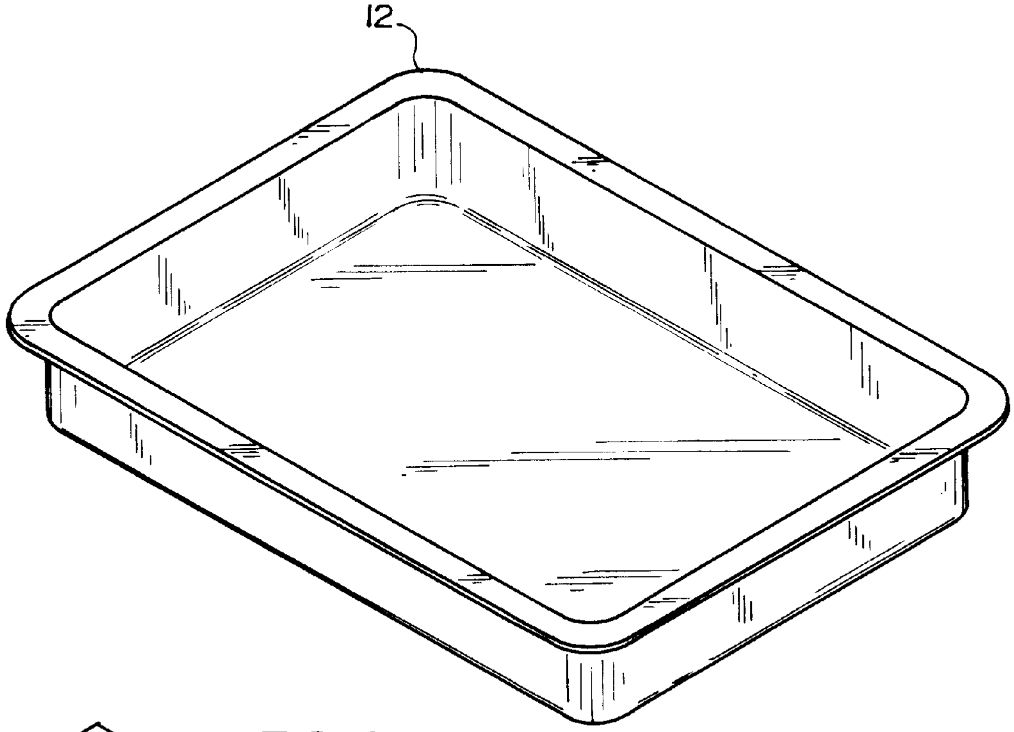
FIG. 3 is a perspective view of the pan of the present invention.
Figure 4:
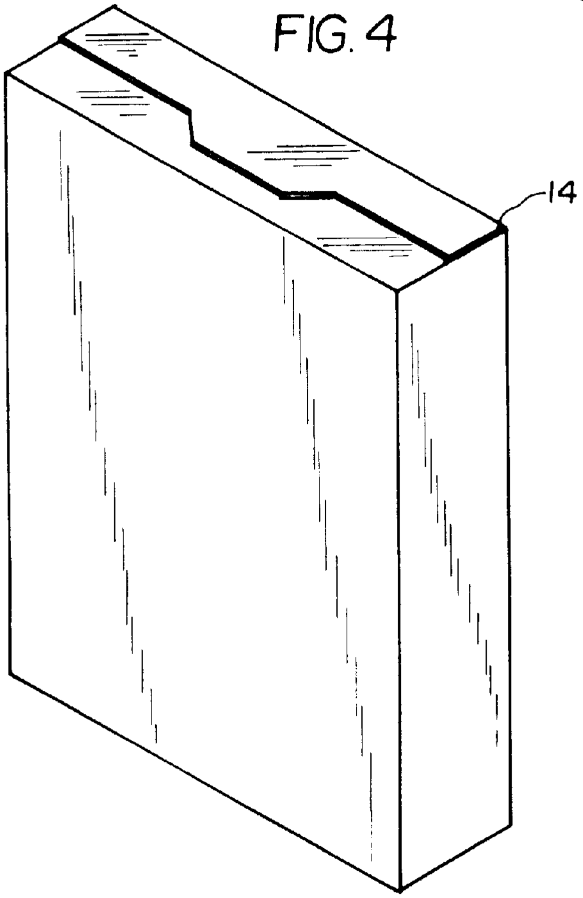
FIG. 4 is a perspective view of the plaster of the present invention.

With reference now to the drawings, and in particular to FIGS. 1 through 5 thereof, a new plaster memorabilia system embodying the principles and concepts of the present invention and generally designated by the reference numeral 10 will be described.

The present invention, designated as numeral 10, includes a pan 12 having a rectangular bottom face with a periphery having a side wall coupled thereto. Such side wall extends upwardly from the bottom face thereby defining an open top and an upper peripheral edge. The pan further includes a horizontally oriented peripheral flange integrally coupled to the upper peripheral edge of the side wall of the pan and extending outwardly therefrom.

In use, the pan is adapted to accept a predetermined amount of plaster 14 and water therein. As such, various body parts may be impressed within the wet plaster prior to the plaster drying after which a plaster block is rendered.

Figure 5:
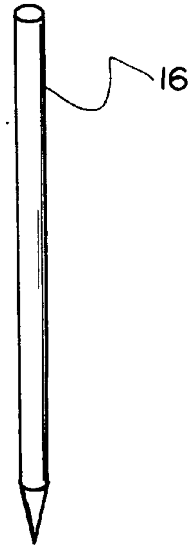
FIG. 5 is an illustration of the writing utensil of the present invention.

FIG. 5 shows a unitary writing utensil 16 having a cylindrical configuration with a conical-shaped end. Such end is adapted for writing various alphanumeric characters in the plaster prior to the plaster drying.

Also included is a frame assembly 18 having a front extent 19 with a side wall defining an open inboard end and an open outboard end. The side wall includes four side faces which are each beveled outwardly from the inboard end to the outboard end thereof. Note FIG. 2. The inboard end has a peripheral recess 20 formed therein for receiving a periphery of the plaster block. Four posts 21 are each integrally coupled to an associated one of four corners of the inboard end of the frame. These posts extend rearwardly from the frame with a coaxial threaded bore formed therein.

The frame further includes a rear extent 22 comprising a rectangular plate with a size and shape corresponding to that of the inboard end of the front extent. The rectangular plate has a plurality of sleeves 23 each integrally coupled to an associated one of four corners of the plate and extending forwardly therefrom for releasably receiving the corresponding post of the front extent. In use, screws 24 are adapted to pass through bores formed in the plate and engage the threaded bores of the posts. Such action secures the plaster block within the frame such that the same may be hung on a wall and the impressions and characters may be displayed via the outboard end of the frame. For allowing the frame to be hung on a wall or the like, heavy duty cable is preferably attached to a rear face of the plate.

The method associated with the present invention will now be set forth. First, the user mixes some plaster with water thereby rendering wet plaster which is situated within the pan. Next, a top layer of the wet plaster is smoothed after which various body parts such as hands and feet are impressed within the wet plaster. Thereafter, various alphanumeric characters are written within the wet plaster by way of the writing utensil. Such characters preferably consist of the name of the person and date associated with the impression. In the alternative, other greetings or the like may be written. Next, the user must wait for the plaster to dry into a rigid plaster block after which the plaster block is mounted within the frame in the manner set forth hereinabove.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for making plaster memorabilia comprising, in combination:

a pan including a rectangular bottom face with a periphery having a side wall coupled thereto and extending upwardly therefrom thereby defining an open top and an upper peripheral edge, the pan further including a horizontally oriented peripheral flange integrally coupled to the upper peripheral edge of the pan and extending outwardly therefrom, whereby the pan is adapted to accept a predetermined amount of plaster therein such that various body parts may be impressed therein prior to the plaster drying after which a plaster block is rendered;

a unitary writing utensil having a cylindrical configuration with a conical-shaped end for writing various alphanumeric characters in the plaster prior to the plaster drying;

a frame assembly including a front extent having a side wall defining an open inboard end and an open outboard end, the side wall including four side faces each beveled outwardly from the inboard end to the outboard end thereof, the inboard end having a peripheral recess formed therein for receiving a periphery of the plaster block and four posts each integrally coupled to an associated one of four corners of the inboard end of the frame and extending rearwardly therefrom with a coaxial threaded bore formed therein, the frame further including a rear extent including a rectangular plate with a size and shape corresponding to that of the inboard end of the front extent, the rectangular plate having a plurality of sleeves each integrally coupled to an associated one of four corners of the plate and extending forwardly therefrom for releasably receiving the corresponding post of the front extent, wherein screws are adapted to pass through bores formed in the plate and engage the threaded bore of the associated post thereby securing the plaster block within the frame such that the same may be hung on a wall and the impressions and characters may be displayed via the outboard end of the frame.

2. A device for making plaster memorabilia comprising:

a pan for accepting a predetermined amount of plaster therein such that various body parts may be impressed therein prior to the plaster drying after which a plaster block is rendered; and a frame assembly for receiving the plaster block therein such that the impressions may be displayed via an outboard end of the frame,the frame assembly including a front extent having a side wall defining an open inboard end and an open outboard end, the side wall including four side faces each beveled outwardly from the inboard end to the outboard end thereof, the inboard end having a peripheral recess formed therein for receiving a periphery of the plaster block and four posts each integrally coupled to an associated one of four corners of the inboard end of the frame and extending rearwardly therefrom with a coaxial threaded bore formed therein, the frame further including a rear extent including a rectangular plate having a plurality of sleeves each integrally coupled to an associated one of four corners of the plate and extending forwardly therefrom for releasably receiving the corresponding post of the front extent, wherein screws are adapted to pass through bores formed in the plate and engage the threaded bore of the associated post.

3. A device for making plaster memorabilia as set forth in claim 2 wherein the frame is adapted to be hung on a wall.

4. A device for making plaster memorabilia as set forth in claim 2 and further including a writing utensil for writing various alphanumeric characters in the plaster prior to the plaster drying.

5. A method making plaster memorabilia comprising the steps of:

providing a pan for accepting a predetermined amount of plaster therein such that various body parts may be impressed therein prior to the plaster drying after which a plaster block is rendered;

providing a writing utensil for writing various alphanumeric characters in the plaster prior to the plaster drying;

providing a frame assembly for receiving the plaster block therein such that the same may be hung on a wall and the impressions may be displayed via an outboard end of the frame, wherein the frame assembly includes a front extent having a side wall defining an open inboard end and an open outboard end, the side wall including four side faces each beveled outwardly from the inboard end to the outboard end thereof, the inboard end having a peripheral recess formed therein for receiving a periphery of the plaster block and four posts each integrally coupled to an associated one of four corners of the inboard end of the frame and extending rearwardly therefrom with a coaxial threaded bore formed therein, the frame further including a rear extent including a rectangular plate having a plurality of sleeves each integrally coupled to an associated one of four corners of the plate and extending forwardly therefrom for releasably receiving the corresponding post of the front extent, wherein screws are adapted to pass through bores formed in the plate and engage the threaded bore of the associated post;

placing wet plaster within the pan;

impressing various body parts within the wet plaster;

writing various alphanumeric characters within the wet plaster;

waiting for the plaster to dry into a rigid plaster block; and securing the plaster block within the frame.

* * * * *